(12) United States Patent
Etchegoyen

(10) Patent No.: US 8,423,473 B2
(45) Date of Patent: Apr. 16, 2013

(54) SYSTEMS AND METHODS FOR GAME ACTIVATION

(75) Inventor: Craig S. Etchegoyen, Irvine, CA (US)

(73) Assignee: Uniloc Luxembourg S. A., Luxembourg (LU)

( * ) Notice: Subject to any disclaimer, the term of this patent is extended or adjusted under 35 U.S.C. 154(b) by 394 days.

(21) Appl. No.: 12/784,262

(22) Filed: May 20, 2010

(65) Prior Publication Data
US 2010/0323798 A1 Dec. 23, 2010

Related U.S. Application Data

(60) Provisional application No. 61/218,580, filed on Jun. 19, 2009.

(51) Int. Cl.
G06F 21/00 (2006.01)

(52) U.S. Cl.
USPC .......... 705/59; 705/51; 705/52; 705/53; 705/54; 705/55; 705/56; 705/57; 705/58; 705/902; 726/26; 726/31; 726/32; 726/33

(58) Field of Classification Search .......... 705/51–59, 705/902; 726/26, 31–33
See application file for complete search history.

(56) References Cited

U.S. PATENT DOCUMENTS

| 4,278,837 | A | 7/1981 | Best |
| 4,351,982 | A | 9/1982 | Miller et al. |
| 4,446,519 | A | 5/1984 | Thomas |
| 4,458,315 | A | 7/1984 | Uchenick |
| 4,471,163 | A | 9/1984 | Donald et al. |
| 4,484,217 | A | 11/1984 | Block et al. |
| 4,593,353 | A | 6/1986 | Pickholtz |
| 4,599,489 | A | 7/1986 | Cargile |
| 4,654,799 | A | 3/1987 | Ogaki et al. |
| 4,658,093 | A | 4/1987 | Hellman |
| 4,688,169 | A | 8/1987 | Joshi |
| 4,704,610 | A | 11/1987 | Smith et al. |
| 4,740,890 | A | 4/1988 | William |
| 4,791,565 | A | 12/1988 | Dunham et al. |
| 4,796,220 | A | 1/1989 | Wolfe |
| 4,864,494 | A | 9/1989 | Kobus, Jr. |
| 4,982,430 | A | 1/1991 | Frezza et al. |

(Continued)

FOREIGN PATENT DOCUMENTS

| AU | 678985 | 6/1997 |
| DE | 101 55 755 A1 | 5/2003 |

(Continued)

OTHER PUBLICATIONS

Williams, R., "A Painless Guide to CRC Error Detection Algorithms", Ver. 3, Aug. 19, 1993.

(Continued)

Primary Examiner — Calvin Cheung
(74) Attorney, Agent, or Firm — Sean D. Burdick

(57) ABSTRACT

Techniques are provided for controlling the activation of computer games. In one embodiment, the technique may involve receiving a combination of a game identifier for the game and a device identifier for the device. The technique may further involve accessing a database of known game identifiers, each known game identifier being associated with a device count corresponding to a total number of known devices on which a known game was previously played or activated, and obtaining a usage policy for the game.

11 Claims, 13 Drawing Sheets

U.S. PATENT DOCUMENTS

| | | | |
|---|---|---|---|
| 4,999,806 A | 3/1991 | Chernow et al. | |
| 5,103,476 A | 4/1992 | Waite et al. | |
| 5,113,518 A | 5/1992 | Durst et al. | |
| 5,199,066 A | 3/1993 | Logan | |
| 5,210,795 A | 5/1993 | Lipner et al. | |
| 5,222,133 A | 6/1993 | Chou et al. | |
| 5,222,134 A | 6/1993 | Waite et al. | |
| 5,260,999 A | 11/1993 | Wyman | |
| 5,287,408 A | 2/1994 | Samson | |
| 5,291,598 A | 3/1994 | Grundy | |
| 5,319,705 A | 6/1994 | Halter et al. | |
| 5,337,357 A | 8/1994 | Chou et al. | |
| 5,343,526 A | 8/1994 | Lassers | |
| 5,379,433 A | 1/1995 | Yamagishi | |
| 5,390,297 A | 2/1995 | Barber et al. | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,509,070 A | 4/1996 | Schull | |
| 5,638,513 A | 6/1997 | Ananda | |
| 5,666,415 A | 9/1997 | Kaufman | |
| 5,745,879 A | 4/1998 | Wyman | |
| 5,754,763 A | 5/1998 | Bereiter | |
| 5,754,864 A | 5/1998 | Hill | |
| 5,790,664 A | 8/1998 | Coley et al. | |
| 5,893,910 A | 4/1999 | Martineau et al. | |
| 5,925,127 A | 7/1999 | Ahmad | |
| 5,956,505 A | 9/1999 | Manduley | |
| 5,970,143 A * | 10/1999 | Schneier et al. | 713/181 |
| 5,974,150 A | 10/1999 | Kaish et al. | |
| 6,006,190 A | 12/1999 | Baena-Arnaiz et al. | |
| 6,009,401 A | 12/1999 | Horstmann | |
| 6,044,471 A | 3/2000 | Colvin | |
| 6,049,789 A | 4/2000 | Frison et al. | |
| 6,070,171 A | 5/2000 | Snyder et al. | |
| 6,101,606 A | 8/2000 | Diersch et al. | |
| 6,134,659 A | 10/2000 | Sprong et al. | |
| 6,158,005 A | 12/2000 | Bharathan et al. | |
| 6,169,976 B1 | 1/2001 | Colosso | |
| 6,189,146 B1 | 2/2001 | Misra et al. | |
| 6,226,747 B1 | 5/2001 | Larsson et al. | |
| 6,230,199 B1 | 5/2001 | Revashetti et al. | |
| 6,233,567 B1 | 5/2001 | Cohen | |
| 6,236,971 B1 | 5/2001 | Stefik et al. | |
| 6,243,468 B1 | 6/2001 | Pearce et al. | |
| 6,294,793 B1 | 9/2001 | Brunfeld et al. | |
| 6,327,617 B1 | 12/2001 | Fawcett | |
| 6,330,670 B1 | 12/2001 | England et al. | |
| 6,343,280 B2 | 1/2002 | Clark | |
| 6,363,486 B1 | 3/2002 | Knapton, III | |
| 6,449,645 B1 | 9/2002 | Nash | |
| 6,467,088 B1 | 10/2002 | alSafadi et al. | |
| 6,536,005 B1 | 3/2003 | Augarten | |
| 6,557,105 B1 | 4/2003 | Tardo et al. | |
| 6,587,842 B1 | 7/2003 | Watts | |
| 6,697,948 B1 | 2/2004 | Rabin et al. | |
| 6,785,825 B2 | 8/2004 | Colvin | |
| 6,829,596 B1 * | 12/2004 | Frazee | 705/66 |
| 6,857,078 B2 | 2/2005 | Colvin | |
| 6,859,793 B1 | 2/2005 | Lambiase | |
| 6,880,086 B2 | 4/2005 | Kidder et al. | |
| 6,920,567 B1 | 7/2005 | Doherty et al. | |
| 6,976,009 B2 | 12/2005 | Tadayon et al. | |
| 7,020,635 B2 | 3/2006 | Hamilton et al. | |
| 7,024,696 B1 | 4/2006 | Bahar | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,146,645 B1 | 12/2006 | Hellsten et al. | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,228,567 B2 | 6/2007 | Serkowski et al. | |
| 7,272,728 B2 | 9/2007 | Pierson et al. | |
| 7,313,828 B2 | 12/2007 | Holopainen | |
| 7,319,987 B1 | 1/2008 | Hoffman et al. | |
| 7,327,280 B2 | 2/2008 | Bachelder et al. | |
| 7,328,453 B2 | 2/2008 | Merkle et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,644,442 B2 | 1/2010 | Miller et al. | |
| 7,653,899 B1 | 1/2010 | Lindahi et al. | |
| 7,890,950 B1 | 2/2011 | Nanavati et al. | |
| 7,908,662 B2 | 3/2011 | Richardson | |
| 7,912,787 B2 | 3/2011 | Sakakihara et al. | |
| 8,229,858 B1 * | 7/2012 | Mazza et al. | 705/59 |
| 8,321,352 B1 * | 11/2012 | Rameshkumar et al. | 705/59 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0069172 A1 | 6/2002 | Omshehe et al. | |
| 2002/0082997 A1 | 6/2002 | Kobata et al. | |
| 2002/0152395 A1 | 10/2002 | Zhang et al. | |
| 2002/0152401 A1 | 10/2002 | Zhang et al. | |
| 2002/0161718 A1 | 10/2002 | Coley et al. | |
| 2003/0046566 A1 | 3/2003 | Holopainen | |
| 2003/0065918 A1 | 4/2003 | Willey | |
| 2003/0125975 A1 | 7/2003 | Danz et al. | |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0039916 A1 | 2/2004 | Aldis et al. | |
| 2004/0059929 A1 | 3/2004 | Rodgers et al. | |
| 2004/0059938 A1 | 3/2004 | Hughes et al. | |
| 2004/0066417 A1 | 4/2004 | Anabuki et al. | |
| 2004/0143746 A1 | 7/2004 | Ligeti et al. | |
| 2004/0177354 A1 | 9/2004 | Gunyakti et al. | |
| 2004/0187018 A1 | 9/2004 | Owen et al. | |
| 2004/0221169 A1 | 11/2004 | Lee et al. | |
| 2004/0249763 A1 | 12/2004 | Vardi | |
| 2005/0027657 A1 | 2/2005 | Leontiev et al. | |
| 2005/0071280 A1 | 3/2005 | Irwin et al. | |
| 2005/0076334 A1 | 4/2005 | Demeyer | |
| 2005/0108173 A1 | 5/2005 | Stefik et al. | |
| 2005/0138155 A1 | 6/2005 | Lewis | |
| 2005/0165693 A1 | 7/2005 | Morritzen et al. | |
| 2005/0172280 A1 | 8/2005 | Ziegler et al. | |
| 2005/0262498 A1 | 11/2005 | Ferguson et al. | |
| 2005/0289072 A1 * | 12/2005 | Sabharwal | 705/59 |
| 2006/0048236 A1 | 3/2006 | Multerer et al. | |
| 2006/0064756 A1 | 3/2006 | Ebert | |
| 2006/0072444 A1 | 4/2006 | Engel et al. | |
| 2006/0095454 A1 | 5/2006 | Shankar et al. | |
| 2006/0161914 A1 | 7/2006 | Morrison et al. | |
| 2006/0190403 A1 | 8/2006 | Lin et al. | |
| 2006/0242081 A1 | 10/2006 | Ivanov et al. | |
| 2006/0265337 A1 | 11/2006 | Wesinger, Jr. | |
| 2006/0265758 A1 | 11/2006 | Khandelwal et al. | |
| 2006/0272031 A1 | 11/2006 | Ache et al. | |
| 2006/0282511 A1 | 12/2006 | Takano et al. | |
| 2007/0143228 A1 | 6/2007 | Jorden et al. | |
| 2007/0143844 A1 * | 6/2007 | Richardson et al. | 726/22 |
| 2007/0150418 A1 | 6/2007 | Ben-Menahem et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0282615 A1 | 12/2007 | Hamilton et al. | |
| 2007/0300308 A1 | 12/2007 | Mishura | |
| 2008/0065552 A1 | 3/2008 | Elazar et al. | |
| 2008/0086423 A1 | 4/2008 | Waites | |
| 2008/0141378 A1 | 6/2008 | McLean | |
| 2008/0147556 A1 | 6/2008 | Smith et al. | |
| 2008/0172300 A1 | 7/2008 | Karki et al. | |
| 2008/0228578 A1 | 9/2008 | Mashinsky | |
| 2008/0247731 A1 | 10/2008 | Yamauchi et al. | |
| 2008/0289050 A1 | 11/2008 | Kawamoto et al. | |
| 2008/0320607 A1 | 12/2008 | Richardson | |
| 2009/0024984 A1 | 1/2009 | Maeda | |
| 2009/0037337 A1 | 2/2009 | Baitalmal et al. | |
| 2009/0083730 A1 | 3/2009 | Richardson | |
| 2009/0138643 A1 | 5/2009 | Charles et al. | |
| 2009/0138975 A1 * | 5/2009 | Richardson | 726/32 |
| 2009/0165080 A1 | 6/2009 | Fahn et al. | |

| | | | |
|---|---|---|---|
| 2009/0228982 A1 | 9/2009 | Kobayashi et al. | |
| 2010/0057703 A1 | 3/2010 | Brandt et al. | |
| 2010/0293096 A1 | 11/2010 | Bussey et al. | |
| 2010/0293622 A1 | 11/2010 | Nikitin et al. | |

FOREIGN PATENT DOCUMENTS

| | | |
|---|---|---|
| EP | 1 096 406 | 5/2001 |
| EP | 1 560 098 | 8/2005 |
| EP | 1637958 | 3/2006 |
| EP | 1637961 | 3/2006 |
| EP | 1670188 | 6/2006 |
| WO | WO 92/09160 | 5/1992 |
| WO | WO 9220022 | 11/1992 |
| WO | WO 9301550 | 1/1993 |
| WO | WO 9535533 | 12/1995 |
| WO | WO 98/42098 | 9/1998 |
| WO | WO 00/72119 | 11/2000 |
| WO | WO 0067095 | 11/2000 |
| WO | WO 2005104686 | 11/2005 |
| WO | WO2007060516 | 5/2007 |
| WO | WO2008013504 | 1/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | 2009158525 | 12/2009 |

OTHER PUBLICATIONS

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

"Technical Details on Microsoft Product Activation for Windows XP," Internet Citation, XP002398930, Aug. 13, 2001.

"How Microsoft Product Activation (WPA) Works in Windows XP and Windows Vista," *PCBUYERBEWARE*, retrieved from the Internet on May 10, 2008. XP002613942.

Corcoran et al., "Techniques for Securing Multimedia Content in Consumer Electronic Appliances using Biometrics Signatures," *Transactions on Consumer Electronics*, Mar. 30, 2005, vol. 51, No. 2, pp. 545-551.

Microsoft Corporation, "Operations Guide: Microsoft Systems Management Server 2003," 2003, Internet Citation retrieved on Jun. 27, 2007. XP 002439673.

Rivest, R. "RFC 1321—The MD5 Message Digest Algorithm," Apr. 1992, Retrieved from the Internet on Jul. 21, 2005.

Wikipedia: "Software Extension," May 28, 2009, Internet Article retrieved on Oct. 11, 2010. XP002604710.

Wikipedia: "Windows Product Activation," dated May 10, 2008 Internet Article retreived from the internet on Dec. 10, 2010, [XP002613941].

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Ye, Ruopeng, "Authenticated Software Update," A Dissertation Submitted to The College of Computer and Information Science of Northeaster University in Partial Fulfillment of the Requirements for the Degree of Doctor of Phisosophy in Computer Science, Apr. 28, 2008.

Wikberg, Michael, "Software License Management from System-Intergrator Viewpoint," Master's Thesis for a Degree for Computer Science and Engineering, School of Science and Technology, Aalto University, Helsinki, Apr. 30, 2010.

\* cited by examiner

SYSTEMS AND METHODS FOR GAME ACTIVATION

This application claims priority to U.S. Provisional Application No. 61/218,580 which was filed Jun. 19, 2009 and which is fully incorporated herein by reference.

BACKGROUND OF THE INVENTION

1. Field of the Invention

The present invention is directed toward systems for activating games, and more particularly, to techniques for interfacing with a user's computing device to generate a device identifier used in determining whether to activate the game on the device.

2. Description of the Related Art

Currently, there exist numerous ways to activate computer/video games, such as, for example, via the Internet or a phone transaction. At the same time, game piracy and unauthorized activations continue to grow at an alarming rate, particularly in emerging economies. In response, game publishers and licensing authorities have focused on ways of making it more difficult for would-be pirates to install and activate a game illegally, such as by installing a single copy of the game on multiple machines. Still, software pirates have found ways to bypass such security measures and continue to activate unauthorized copies of games on multiple machines. Accordingly, it would be desirable to provide a technique for determining the devices on which a game has been activated or played, and for selectively activating the game on a particular computing device in accordance with the usage rights associated with the game.

SUMMARY OF THE INVENTION

The present invention discloses a system for activating a computer game in response to a user attempt to activate or play the game on a computing device. In one embodiment, the apparatus may include a license server configured to receive from the computing device, responsive to a communication link being available between the license server and the computing device and via the communication link, a combination of (a) a game identifier for the game and (b) a device identifier for the computing device, the device identifier including a combination of at least one user-configurable parameter and at least one non-user-configurable parameter of the computing device.

In related aspects, the license server may be configured to access a database of known game identifiers, each known game identifier being associated with (a) a device count corresponding to a total number of known devices on which a known game was previously played and (b) known device identifiers for the known devices.

In further related aspects, the license server may be configured to: obtain a usage policy for the game, the policy comprising a maximum device count for the game; and send an activation instruction to the device based on a comparison between the device count and the maximum device count. For example, the activation instruction may be a disallow instruction when the device count exceeds the maximum device count, and may be an allow instruction when the device count does not exceed the maximum device count.

In further related aspects, the usage policy may comprise a defined maximum play time for the game on the device. The license server may send the activation instruction to the device based at least in part on a time comparison between the maximum play time and an actual play time of the game on the device. For example, the activation instruction may be a disallow instruction when the actual play time exceeds the maximum play time, and may be an allow instruction when the actual play time does not exceed the maximum play time.

In further related aspects, the system may include an Interactive Voice Response (IVR) server in operative communication with the license server and the computing device, wherein the IVR server is configured to, in response to the link not being available between the license server and the device, instruct the user to complete a phone transaction.

In accordance with other aspects of the embodiments described herein, there is provided an apparatus for activating a computer game in response to a user attempt to activate or play the game on a computing device. In one embodiment, the apparatus may include: a transceiver component for communicating with a license authority; at least one processor operatively coupled with the transceiver component; and a memory component operatively coupled with the at least one processor and including executable code for the at least one processor.

For example, the at least one processor may determine a game identifier for the game, and collect machine parameters of a computing device, wherein the machine parameters include a combination of at least one user-configurable parameter and at least one non-user-configurable parameter of the device. The at least one processor may generate a device identifier for the device based at least in part on the machine parameters.

In related aspects, the at least one processor may determine whether an Internet connection is available for the device. In response to the connection being available, the at least one processor may instruct the transceiver to send the game identifier and the device identifier to the license authority. In response to the connection not being available, the at least one processor may prompt the user to complete a phone transaction with the license authority.

In further related aspects, the at least one processor may prompt the user to complete the phone transaction by requesting that the user enter at least one of the game identifier and a first hash code of the game identifier on a phone keypad. In the alternative, or in addition, the at least one processor may prompt the user to complete the phone transaction by requesting that the user enter at least one of the device identifier and a second hash code of the device identifier on a phone keypad.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The present invention addresses the need for a game activation service that provides reliable verification of game usage rights, and that provides game owners, publishers, or license authorities an ability to control the activation of games on user devices. Described herein are improved systems and methods for controlling the activation of such games.

Figure 1:
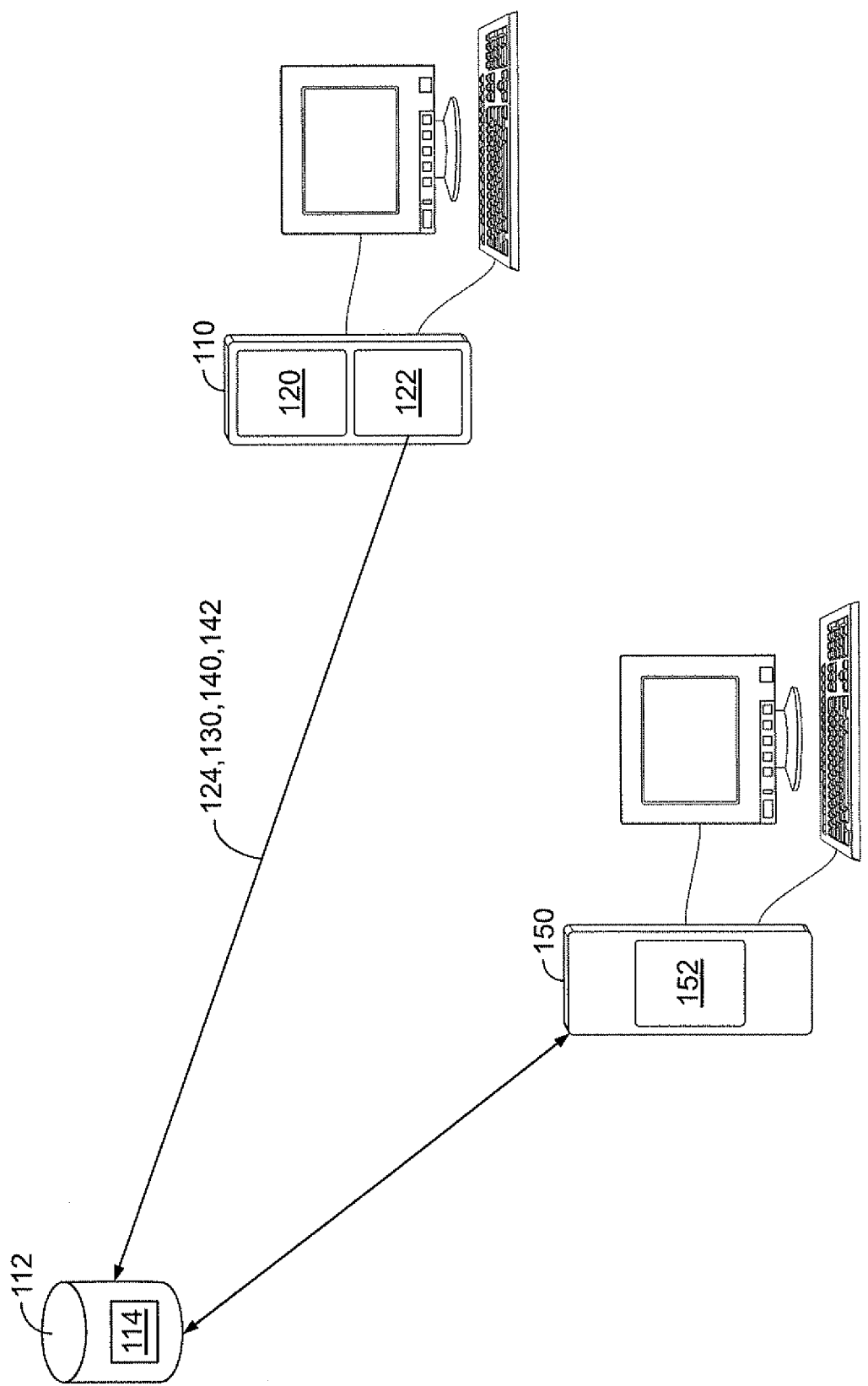
FIG. 1 provides a block diagram of an exemplary system for auditing distributed games or software.
Figure 2:
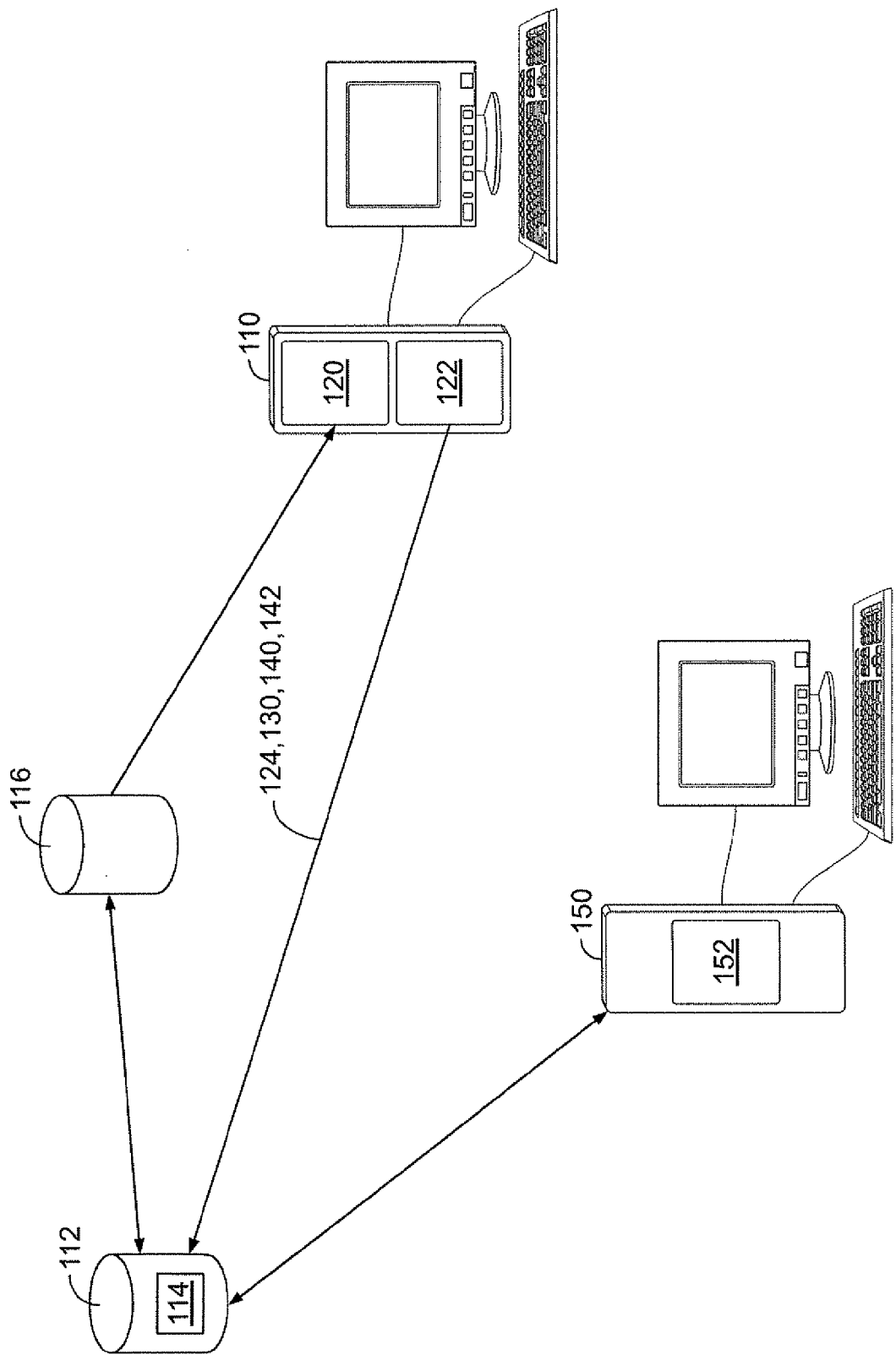
FIG. 2 provides a block diagram of another exemplary system for auditing distributed games or software, wherein the system includes an authentication server.

FIG. 1 illustrates an embodiment of a system 100 according to the invention for authenticating or verifying a game or software license. System 100 may include a plurality of computing devices 110 that are in operative communication with an auditing server 112, for example, through a communication network. While only one computing device 110 is illustrated in FIGS. 1-2, a system according to the invention may comprise any number of computing devices. The computing device 110 includes a processor coupled to memory and may comprise, for example, a game console, a personal computer, a server computer, a laptop computer, a tablet computer, a personal digital assistant, a mobile phone, a wireless communication device, an onboard vehicle computer, or any other machine capable of communicating with a computer network.

The computing device 110 may include in its memory, software 120. Software 120 may comprise, for example, instructions in the form of computer-readable code for running a video game on the computing device. Software 120 is typically proprietary and authorized by the owner for end use on a customer's computing device 110 by means of a user license. The computing device 110 may also comprise an auditing tool or application 122. The auditing application 122 may be any program or application that collects information for purposes of identifying the computing device 110, such as information pertaining to particular hardware or software configurations resident on the computing device 110. The auditing application 122 may comprise a stand alone application or an applet running within a web browser on the device 110 (e.g., an applet comprising executable code for a Java Virtual Machine). The auditing application 122 may be embedded in or associated with another software application, including but not limited to software 120. For example, the auditing application 122 may be embedded in or associated with a tool bar of a software application, such as, for example, a web browser. The auditing application 122 may prompt the user to register with an online software registration service, or may run in the background with little or no interaction with the user of device 110.

The auditing application 122 may include a registration routine that collects information regarding computing device 110 by checking a number of parameters which are expected to be unique to the computing device environment. A parameter so selected may be a user-configurable parameter or a non-user-configurable parameter. Examples of user-configurable parameters may include hard disk volume name, user name, device name, user password, hard disk initialization date, or any other computer readable data stored in memory of the computing device that is created, selected, or determined by the end user. A parameter so selected may also be a non-user-configurable parameter, for example, read-only data stored on hardware resident in or peripheral to the computing device. Examples of non-user-configurable parameters may include information that identifies the hardware comprising the platform on which the web browser runs, such as, for example, CPU number, or unique parameters associated with the firmware in use. Non-user-configurable parameters may further include system configuration information, such as amount of memory, type of processor, software or operating system serial number, etc. In the alternative, or in addition, the parameters checked may include virtual machine specifications. Examples of virtual machine specifications may include, but are not limited to, information relating to virtual processors, virtual BIOS, virtual memory, virtual graphics, virtual IDE drives, virtual SCSI devices, virtual PCI slots, virtual floppy drives, virtual serial (COM) ports, virtual parallel (LPT) ports, virtual keyboard, virtual mouse and drawing tablets, virtual Ethernet card, virtual networking, virtual sound adapter, etc.

Based on the collected information, the auditing application 122 may generate a device identifier 124 that is unique for the user computer 110. In the alternative, or in addition, the application 122 may gather and send the device parameters to a remote server, such as auditing server 112, which in turn generates the device identifier 124. The device identifier 124 may be stored in a hidden directory of the device 110 or at a remote location, such as the auditing server 112. The device identifier 124 may incorporate the device's IP address and/or other geo-location code (e.g., GPS data, cell site triangulation data, or the like, or combinations thereof) to add another layer of specificity to device's unique identifier.

It is noted that an application (e.g., auditing application 122) running on the computing device 110 or otherwise having access to the computing device's hardware and file system may generate a unique device identifier (e.g., device identifier 124) using a process that operates on data indicative of the computing device's configuration and hardware. The device identifier may be generated using a combination of user-configurable and non-user-configurable machine parameters as input to a process that results in the device identifier, which may be expressed in digital data as a binary number. Each machine parameter is data determined by a hardware component, software component, or data component specific to the device to which the unique identifier pertains. Machine parameters may be selected based on the target device system configuration such that the resulting device identifier has a very high probability (e.g., greater than 99.999%) of being unique to the target device. In addition, the machine parameters may be selected such that the resulting device identifier includes at least a stable and unique portion up to and including the entire device identifier. According to the invention, the stable and unique portion of the device identifier has a very high probability of remaining unchanged during normal operation of the computing device. Thus, the resulting device identifier should be highly specific, unique, reproducible and stable as a result of properly selecting the machine parameters.

The application for generating the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured application operating or otherwise having had access to the same computing device for which the device identifier was first generated. Conversely, each identifier, again to a very high degree of certainty, can be successfully reproduced by the suitably configured application operating or otherwise having access to the same computing device on which the identifier was first generated.

The application may operate by performing a system scan to determine a present configuration of the computing device. The application may then select the machine parameters to be used as input for generating the unique device identifier. Selection of parameters may vary depending on the system configuration. Once the parameters are selected, the application may generate the identifier.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; keyboard model; keyboard details; mouse model; mouse details; printer details; and scanner details.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; webcam; game controller; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 3:
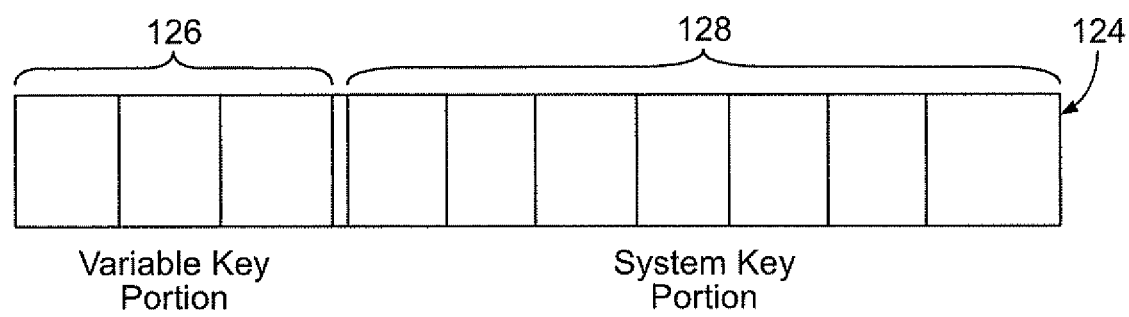
FIG. 3 illustrates the components of an exemplary device identifier.

With reference to FIG. 3, in one embodiment, the device identifier 124 may include two components—namely, a variable key portion 126 and a system key portion 128. The variable key portion 126 may be generated at the time of registration of computing device 110 by reference to a variable platform parameter, such as via reference to system time information, although other parameters which are variable may be utilized in other embodiments. The system key portion 128 may include the above described parameters expected to be unique to the device 110, such as, for example, hard disk volume name, user name, computer name, user password, hard disk initialization date, or combinations thereof. Portions 126 and/or 128 may be combined with the IP address and/or other platform parameters of the device 110. It is noted that device identifiers, or portions thereof, may be encrypted to add an additional layer of specificity and security.

With reference once again to FIG. 1, the auditing application 122 may also include a registration routine that collects or receives information regarding the software 120 on device 110 by checking information which is expected to be unique to software 120, such as, for example, the software serial number. The collected software identifier may include the software serial number, product identification number, product key, etc. The collected software identifier may include information regarding where the software was sold or distributed, who the buyers, sellers, and/or distributors were, which stores the software was sold in, etc. It is noted that the software identifier may be unique to particular copy of software, such as when the software is licensed to a single user. In the alternative, or in addition, the software identifier may be unique to particular type or group of software, such as when the software is licensed to a defined group of users.

The embodiments described herein include an auditing application 122 that collects the software identifier 130 for software 120; however, the systems and components described herein can be adapted to collect one or more types of software identifiers for a plurality of software applications. The software identifier 130 may be stored in a hidden directory of the device 110 or at a remote location, such as the auditing server 112. For example, in one approach, the software identifier, device identifier, or combinations thereof may be hidden in multiple locations on the computing device and may be crosschecked for tampering, corruption, etc. In another approach, the software identifier, device identifier, and/or combinations thereof may be hidden in multiple locations, such as in memory locations accessible by remote servers, and may be crosschecked with each other to verify the integrity of the identifiers.

The auditing application 122 may also include a registration routine that collects or receives information regarding the geo-location code 140 of the device 110. The geo-locater 140 may comprise the IP address, GPS data, cell site triangulation data, or the like for the device 110.

Auditing application 122 may electronically send the device identifier 124 and the software identifier 130 to the auditing server 112. In the alternative, or in addition, a geo-location code 140 may be associated with the device identifier 124 or the software identifier 130 and may be sent to the auditing server 112, such as via a secured network connection. The auditing server 112 may encrypt and store the data, such as the device identifier 124, the software identifier 130, or the geo-location code 140, as received from the computing device 110. The auditing server 112 may receive such data from a plurality of computing devices and store the received data in an audit database 114.

In one embodiment, the auditing application 122 may generate an audit number 142 by associating the software identifier 130 with one or both of the device identifier 124 and the geo-location code 140, and may send the generated audit number 142 to the auditing server 112. In another embodiment, the application 122 may send the device identifier 124, the software identifier 130, and the geo-location code 140 to the server 112 in a piecemeal manner. The server 112 may in turn generate the audit number 142. The auditing server 112 may receive or generate audit numbers from a plurality of computing devices and store the received audit numbers in the audit database 114.

It is noted that the audit number 142 may be generated from the device identifier 124, the software identifier 130, and/or the geo-location code 140 via any number of suitable approaches. For example, the software identifier 130 may be concatenated or linked with the device identifier 124 or geo-location code 140. It is also noted that the audit number 142 may be stored in a hidden directory of the device 110 or at a remote location, such as the auditing server 112. It is further noted that the device identifier 124, the software identifier 130, and/or the geo-location code 140 may at a later time be extracted from the audit number 142.

When a user of a computing device, including but not limited to computing device 110, installed with auditing application 122, attempts to run the software 120, the auditing application 122 in response may transmit the software identifier 130 associated with the device identifier 124 or the geo-location code 140 (or an audit number 142 generated from such data) to the auditing server 112, which in turn may store the received data in the audit database 114.

With reference to FIG. 2, there is provided an embodiment of a system that further comprises an optional authentication server 116 that is in operative communication with the auditing server 112. When a particular user tries to run software 120 on a computing device, the authentication server 116 may access the audit database 114 on auditing server 112 to determine whether to allow the software 120 to be run. The authentication server 116 may receive or access the license terms for a particular software from the auditing server 112 or another server or computing device.

In one embodiment, the authentication server 116 may disallow use of the software 120 beyond a defined maximum number of allowed users or seats (which may be defined by the software license). The server 116 may analyze the data in the audit database 114 and determine how many seats are currently utilizing software 120. If the number of currently allowed seats meets or exceeds the maximum number of allowed seats, the server 116 may throttle or disallow the use of software 120 by more seats; otherwise, the server may allow the use of the software 120. In another embodiment, the authentication server 116 may throttle or disallow use of the software 120 if its software identifier is already associated with a different device identifier or a different IP address in the audit database 114; otherwise, the server 116 may allow use of the software 120. The authentication server 116 may collect data regarding the instances of allowed and disallowed software use, and may share such data with the auditing server 112.

With reference to the embodiments of FIGS. 1-2, the auditing server 112 may be in operative communication with a management device 150, which may be any device capable of communication with a computer network, such as, for example, a personal computer, a server computer, a laptop computer, a tablet computer, a personal digital assistant, a mobile phone, or a wireless communication device. The management device 150 may comprise a management application 152, which may be any program or application, such as a stand alone application or an application that is embedded or associated with another software application, such as an applet running within a web browser on the device 150.

The management application 152 may be adapted to allow a user, such as, for example, a software manufacturer or distributor, to view the data collected and stored in the audit database 114 of the audit server 112. The present embodiment will be described in the context of a software manufacturer utilizing the management application 152. However, it will be understood that any user of the management device may utilize the management application 152. The management application 152 may present the data in the audit database 114 in a manner that allows its user to better understand how its software is being used, legitimately or otherwise.

Figure 4A:
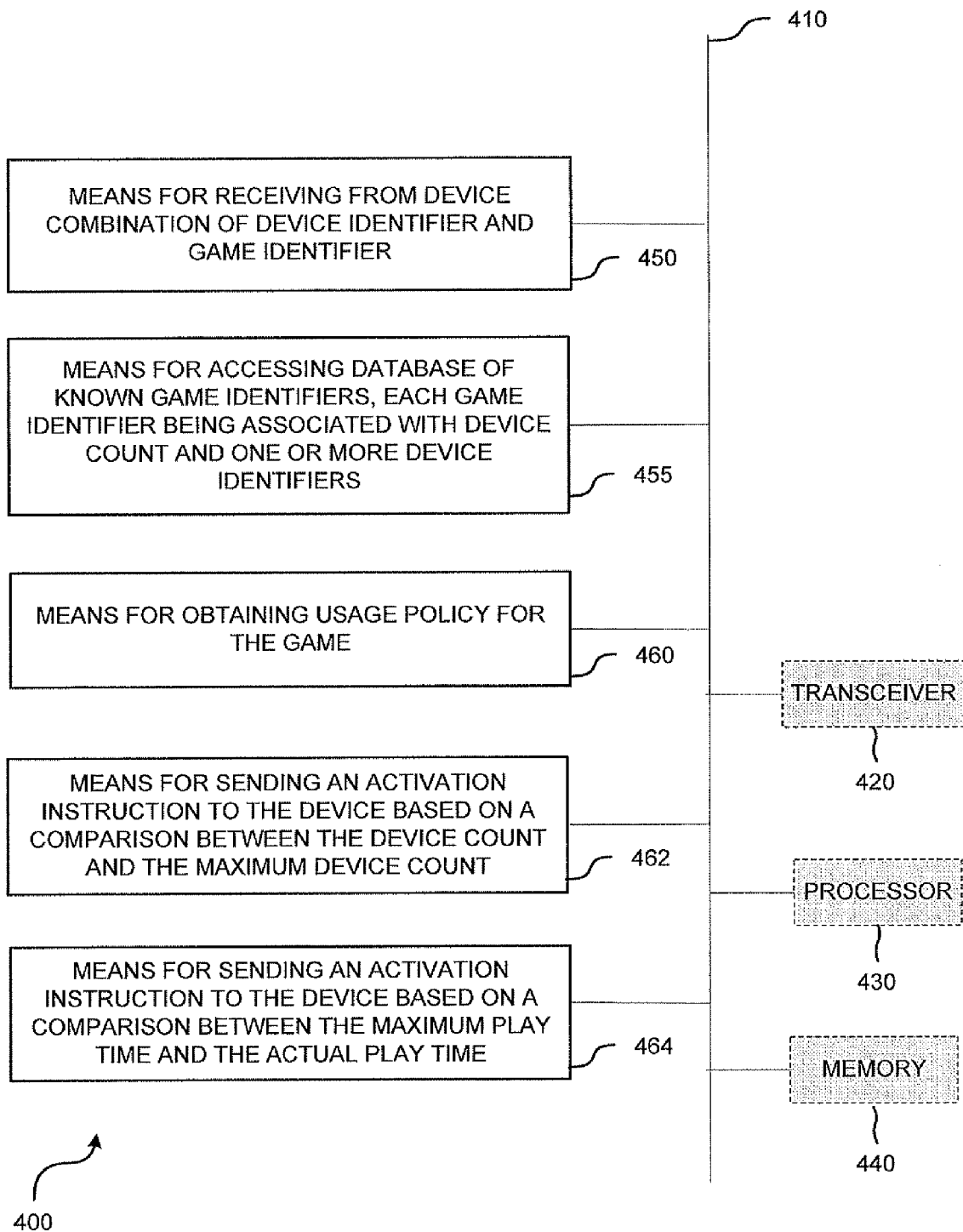
FIG. 4A illustrates one embodiment an apparatus for controlling the activation of a game.

In accordance with one or more aspects of the embodiments described herein, there are provided devices and apparatuses for activating a computer game in response to a user attempting to activate or play the game on a computing device. The game may be activated remotely (e.g., from the license authority side). With reference to FIG. 4A, there is provided an exemplary apparatus 400 that may be configured as either a computing device, or as a processor or similar device for use within a computing device. As illustrated, apparatus 400 may comprise a means 450 for receiving from a device a combination of a device identifier and a game (software) identifier. The device identifier may be based on a combination of at least one user-configurable parameter and at least one non-user configurable parameter of the device. In this way, the device identifier is unique and no device will share the same identifier.

The apparatus 400 may comprise a means 455 for accessing a database of known game identifiers, each known game identifier being associated with a device count and one or more device identifiers. The device count corresponds to a total number of known devices on which a particular game was previously played. For example, the database may contain a device count associated with a particular "xyz racing game" indicating how many different machine(s) the "xyz racing game" has been activated on. In the alternative, or in addition, the database may contain a device count associated with a particular "xyz racing game" indicating how many different machine(s) the "xyz racing game" has been played on.

The apparatus 400 may comprise a means 460 for obtaining a usage policy for the game. The policy may comprise usage limitations such as a maximum device count for the game and maximum hours the game can be played. When the usage policy includes a defined maximum device count, the apparatus 400 may also comprise a means 462 for sending an activation instruction to a user device based on a comparison between the device count and the maximum device count. For example, the activation instruction may comprise a disallow instruction when the device count exceeds the maximum device count. The disallow instruction prevents the user from playing the game on the device by causing the device to not execute the game or to shutdown, for example. Alternatively, the activation instruction may comprise an allow instruction when the device count does not exceed the maximum device count. For example, the allow instruction may allow the user to play the game on the device by allowing the device to execute the game without usage restrictions.

When (a) the usage policy includes a defined maximum play time that the game can be played, and (b) the user's play time exceeds the maximum play time, then the apparatus 400 (e.g., a license server) may send a time-triggered disallow instruction that prevents a user from continuing to the play game on a user device. The apparatus 400 may comprise a means 464 for sending an activation instruction (e.g., a disallow instruction or an allow instruction) to a user device based on a comparison of the actual play time (e.g., the number of hours the game has been played on the user device) and the defined maximum play time. In another example, the license server may deploy an application that is installed on the user device, which in turn prevents the user from playing the game when play time exceeds the maximum play time.

Figure 4B:
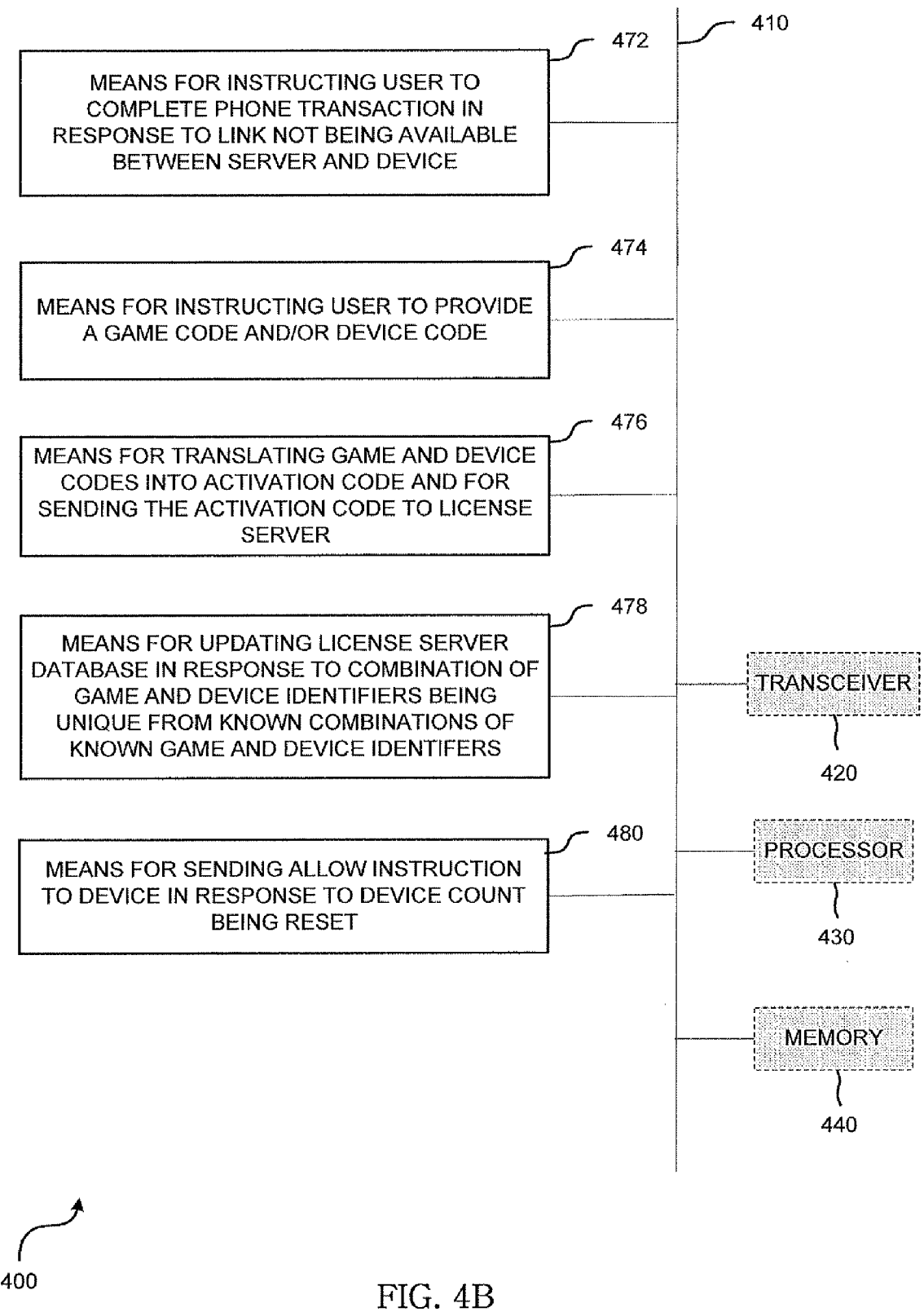
FIG. 4B-C illustrate sample aspects of the apparatus shown in FIG. 4A.

With reference to FIG. 4B, apparatus 400 may comprise a means 472 for instructing the user to complete the transaction by phone if the Internet connection/link between the device and the license server is not available or malfunctioned. This may be accomplished using an interactive voice response (IVR) server in operative communication with the license server and the device. The IVR may be a fully automated voice recognition system that may interact with the user and the license server. Alternatively, the user may be forwarded to an operator. Means for monitoring the Internet connection between the device and the licenser server may be part of the IVR or the license server. Apparatus 400 may further comprise a means 474 for instructing the user to provide a game code and or the device code. The game code may comprise at least one of the game identifier and a hash code of the game identifier. The device code may comprise at least one of the device identifier and a hash code of the device identifier.

The apparatus 400 may comprises a means 476 for translating the game and device codes into one or more activation codes and for sending the activation code(s) to the license server. The license server is configured to extract the game and device identifier from the received activation code(s).

The apparatus 400 may comprise a means 478 for updating the database in response to the combination of the game identifier and the device identifier being unique from known combinations of the known game identifiers and the known device identifiers. For example, if the combination of the game identifier and the device identifier indicates that the "xyz racing game" was activated or played on a machine with a device identifier not previously known, then the database is updated to indicate that the "xyz racing game" was played on such machine.

Additionally, apparatus 400 may comprise a means 480 for sending an allow instruction to the device in response to the device count being reset. The allow instruction may be sent by the license server. This may occur when the user purchases additional licensing rights to the game.

Figure 4C:
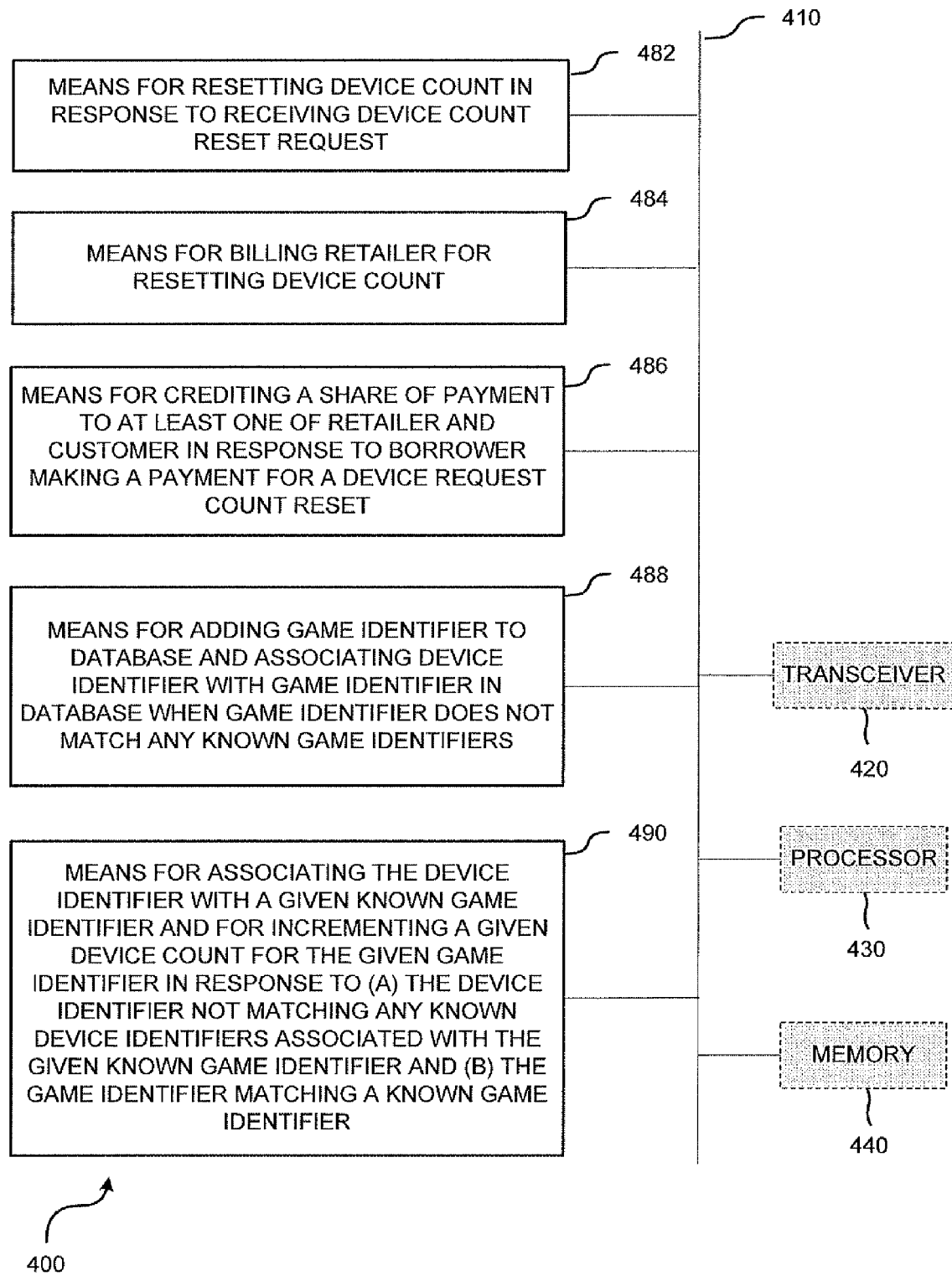

With reference to FIG. 4C, apparatus 400 may comprise a means 482 for resetting the device count in response to receiving a device count reset request. The request may be sent from a retailer. Means 482 may further comprise a means 486 for billing the retailer for resetting the device count. This may occur when the user purchases additional licensing rights to the game via the retailer. Means 482 may also comprises a means 486 for crediting a share of payment to at least one of the retailer and a customer in response to a borrower of the game making a payment for a device request count reset. For example, when a user makes a payment for a device count reset, the payment proceeds can be shared with the retailer involved. Alternatively, the proceeds may be shared with the retailer and the customer. In this scenario, the customer is the person who originally purchased the game. The borrower is the person that borrows the game from the customer. Means 486 provides a way to reward the customer for enticing the borrower to purchase the game or additional licensing rights for the game. In one embodiment, only the retailer is credited with a share of payment made by the borrower.

Apparatus 400 may comprise a means 488 for adding the game identifier to the database, associating the device identifier with the game identifier in the database, and creating a corresponding device count for the game in response to the game identifier not matching any of the known game identifiers in the database. That is, if a game identifier does not match with any known game identifiers in the database, then the game identifier is added to the database, and the device identifier is associated with the game identifier in the database.

Apparatus 400 may comprise a means 490 for associating the device identifier with a given known game identifier and for incrementing a given device count for the given game identifier in response to (a) the device identifier not matching any known device identifiers associated with the given known game identifier and (b) the game identifier matching a known game identifier. In other words, when a game identifier matches with a given known game identifier and when the device identifier does not match with any known device identifiers in the database, the device identifier is associated with the given known game identifier and a given device count for the given known game identifier is incremented by one. Additionally, when a game identifier matches with a given known game identifier and when the device identifier matches with any known device identifiers in the database, then audit information in the database may be updated. In one approach, the audit information may be updated whenever a game identifier and/or device identifier are crosschecked against known identifiers in the database.

It is noted that apparatus 400 may optionally include a processor module 430 having at least one processor, in the case of apparatus 400 configured as computing device, rather than as a processor. Processor 430, in such case, may be in operative communication with one or more of means 450, 455, 460, 462, 464, 472, 474, 476, 478, 480, 482, 484, 486, 488 and 490 (hereinafter "450-490"), and components thereof, via a bus 410 or similar communication coupling. Processor 430 may effect initiation and scheduling of the processes or functions performed by means 450-490, and components thereof.

In related aspects, apparatus 400 may include a transceiver module 420 for communicating with means 450-490. For example, the means for receiving 450 may consist of a software module that provides instructions that when executed by processor 430 causes transceiver module 420 to receive from a computing device a data string that includes a combination of a device identifier and a game identifier. A stand alone receiver and/or stand alone transmitter may be used in lieu of or in conjunction with the transceiver 420.

In further related aspects, apparatus 400 may optionally include a means for storing information, such as, for example, a memory device or memory module 440. Computer readable medium or memory device 440 may be operatively coupled to the other components of apparatus 400 via bus 410 or the like. The computer readable medium or memory device 440 may be adapted to store computer readable instructions and data for effecting the processes and behavior of means 450-490, and components thereof, or processor 430 (in the case of apparatus 400 configured as a computing device) or the methods disclosed herein. In another embodiment, any of means 450-490 may be implemented as a hardware, software, or firmware modules in communication with processor 430. In some embodiments, one or more of these means may be stored as a series of computer readable instructions on memory 440 that are executable by processor 430.

In yet further related aspects, the memory module 440 may optionally include executable code for the processor module 430 to: (a) in response to the user attempting to activate or play the game on the device, receive from the device a combination of (i) a game identifier for the game and (ii) a device identifier for the device, the device identifier being based on a combination of at least one user-configurable parameter and at least one non-user-configurable parameter of the device; (b) access a database of known game identifiers, each known game identifier being associated with (i) a device count corresponding to a total number of known devices on which a known game was previously played and (ii) the known device identifiers for the known devices; (c) obtain a usage policy for the game; (d) send an activation instruction to the device based on a comparison between the device count and the maximum device count under the policy; and/or (e) send the activation instruction to the device based on a comparison between an actual play time and a maximum play time under the policy. The activation instruction may be an allow instruction if the device count does not exceed the maximum device count. Alternatively, the activation instruction may be a disallow instruction if the device count exceeds the maximum device count. One or more of steps (a)-(e) may be performed by processor module 430 in lieu of or in conjunction with the means 450-490 described above.

Figure 5A:
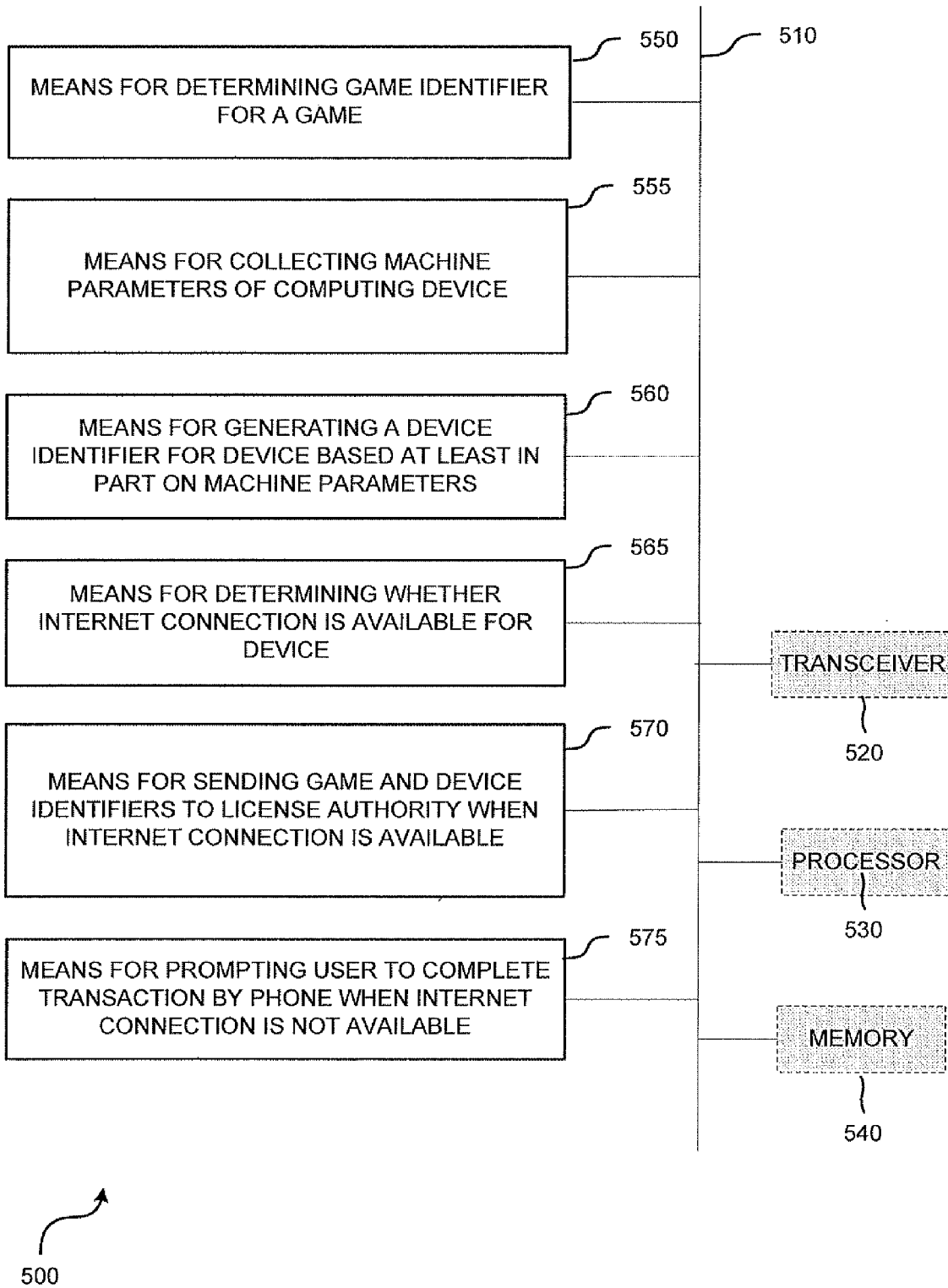
FIG. 5A illustrates another embodiment an apparatus for controlling the activation of a game.

In accordance with one or more aspects of the embodiments described herein, there are provided devices and apparatuses for activating a computer game in response to a user attempting to play the game on a computing device. The activation may be done from the computing device or the user side. With reference to FIG. 5A, there is provided an exemplary apparatus 500 that may be configured as either computing device, or as a processor or similar device for use within a computing device. As illustrated, apparatus 500 may comprise a means 550 for determining a game identifier for the game and means 555 for collecting one or more machine parameters of a computing device. The machine parameters may comprise a combination of at least one user-configurable parameter and at least one non-user-configurable parameter of the device. The apparatus 500 may comprise a means 560 for generating a device identifier for the device based at least in part on the collected one or more machine parameters.

The apparatus 500 may comprise a means 565 for determining whether an Internet connection is available for the device and a means 570 for sending a game identifier for the game and the device identifier to a license authority if the Internet connection is available. This may occur, for example, whenever a user attempts to install the game on the device and/or play the game on the device. The apparatus 500 may further comprise a means 575 for prompting the user to complete the transaction by phone when the Internet connection between the license server and the device is not available. The user may be directed to a fully automated voice recognition system or an operator to complete the transaction.

Figure 5B:
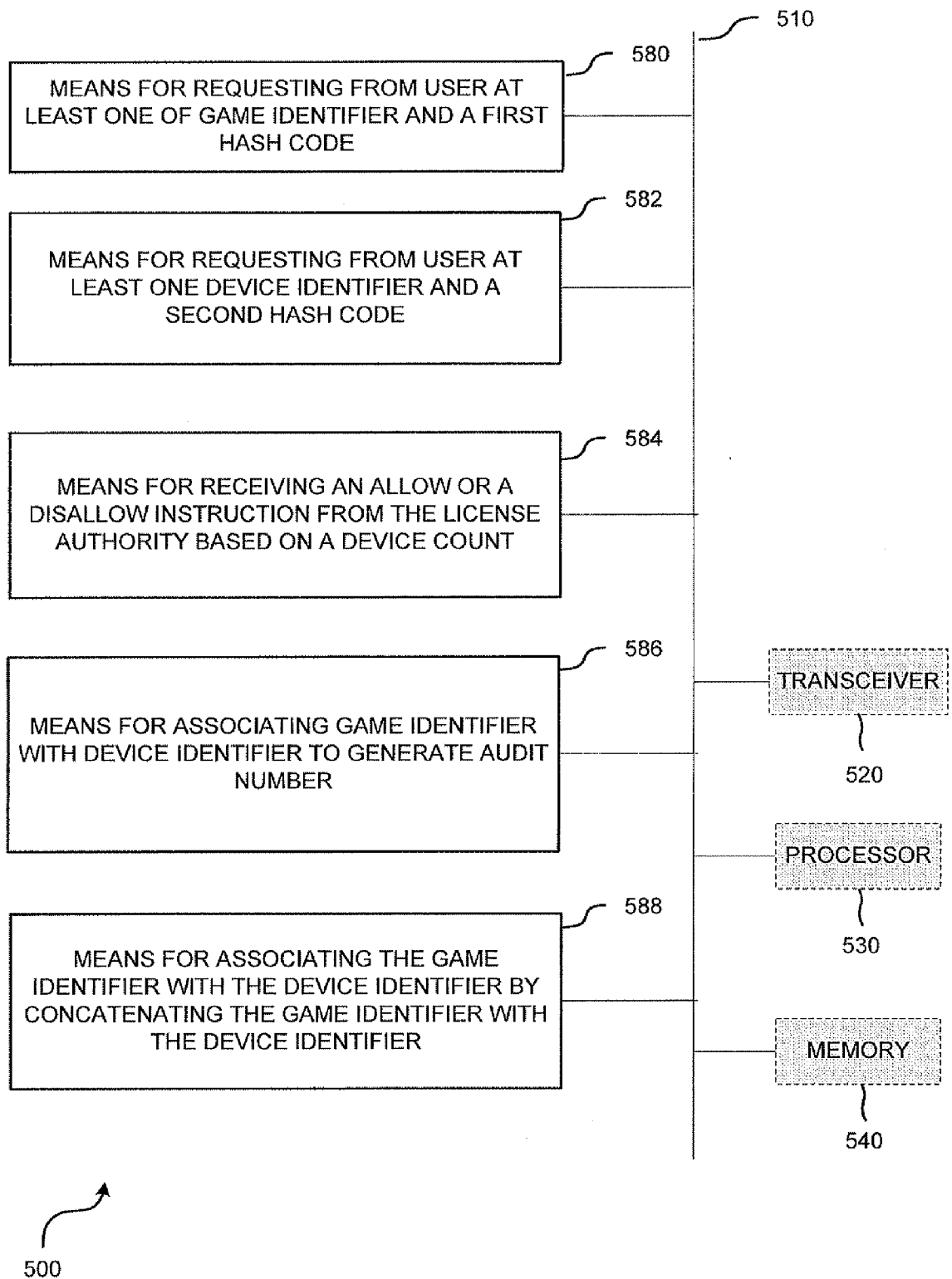
FIG. 5B-C illustrates sample aspects of the apparatus shown in FIG. 5A.

With reference to FIG. 5B, apparatus 500 may comprise a means 580 for requesting from the user at least one of the game identifier and a first hash code and means 582 for requesting from the user at least one of the device identifier and a second hash code of the device identifier. In one embodiment, the user is requested to enter the requested information (e.g., game and device identifiers and hash codes) via the phone keypad. Alternatively, the user may provide the requested information orally. The voice data may then be translated by the fully automated voice recognition system such as an interactive voice response server and subsequently forward the translated data to the license server. In one embodiment, the license authority comprises at least one of the license server and the IVR server.

The apparatus 500 may also comprises a means 584 for receiving an allow or disallow instruction from the license authority based on a device count associated with the game identifier. The device count may correspond to a total number of known devices on which the game was previously played. The allow instruction may allow the user to play the game on the device, and the disallow instruction may prevent the user from playing the game on the device.

The apparatus 500 may comprise a means 586 for associating the game identifier with the device identifier to generate an audit number and for sending the audit number to the license authority. The transmission of the audit number may be accomplished, for example, using a transceiver. The means 586 may further comprise a means 588 for associating the game identifier with the device identifier by concatenating the game identifier with the device identifier according to a predetermined concatenation formula. Alternatively, means 588 may comingle the game identifier with the device identifier by comingling according to a predetermined comingling formula.

Figure 5C:
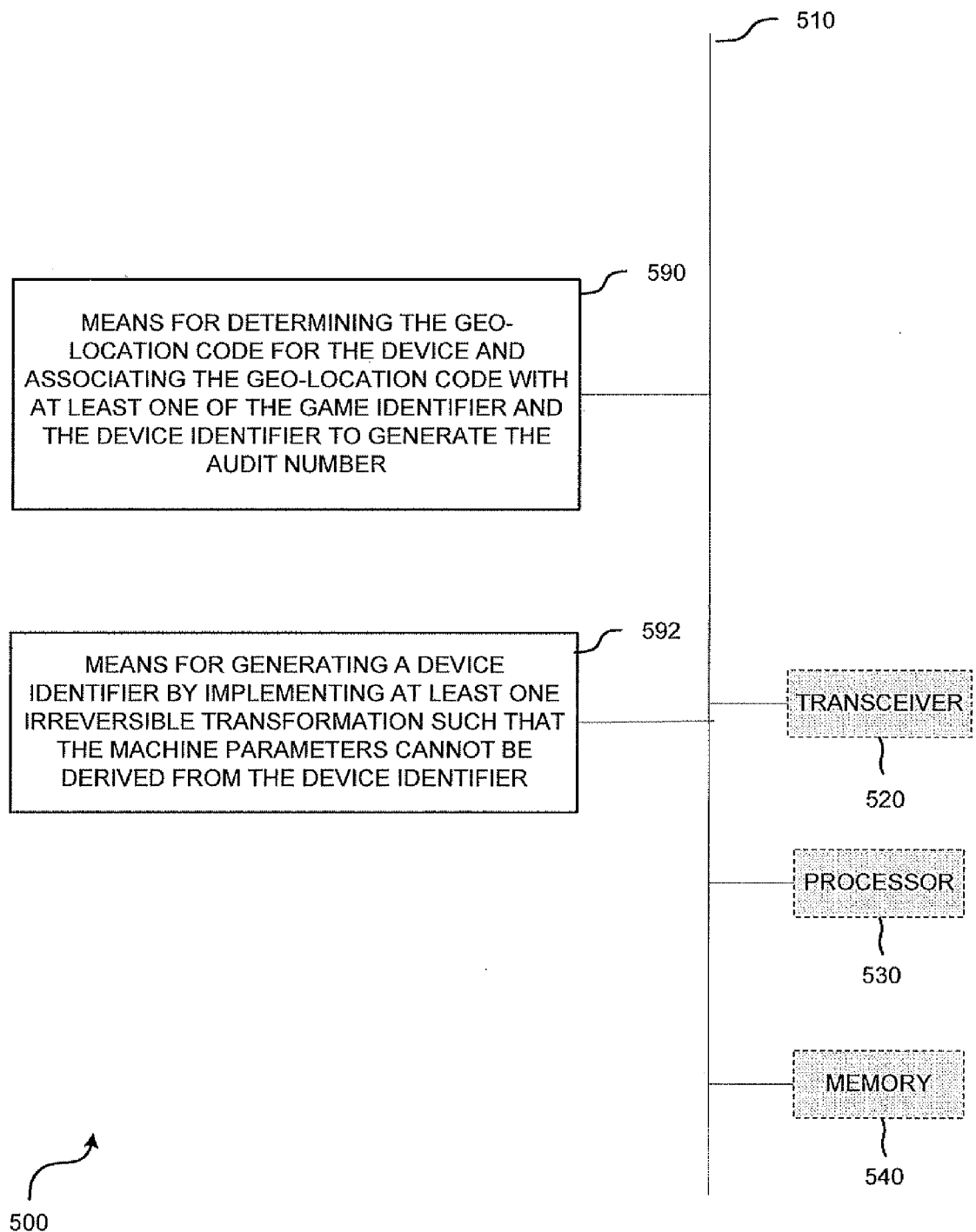

With reference to FIG. 5C, apparatus 500 may comprise a means 590 for determining the geo-location code for the device and for associating the geo-location code with at least one of the game identifier and the device identifier to generate the audit number. The geo-location code may comprise an Internet protocol (IP) address. Also, the game identifier may comprise a game serial number.

The apparatus 500 may further comprise a means 592 for generating a device identifier by implementing or executing at least one irreversible transformation such that the machine parameters cannot be derived from the device identifier. Additionally, the irreversible transformation may comprise a cryptographic hash function.

It is noted that apparatus 500 may optionally include a processor module 530 having at least one processor, in the case of apparatus 500 configured as computing device, rather than as a processor. Processor 530, in such case, may be in operative communication with one or more of means 550, 555, 560, 565, 570, 575, 580, 582, 584, 586, 588, 590 and 592 (hereinafter 550-592), and components thereof, via a bus 510 or similar communication coupling. Processor 530 may effect initiation and scheduling of the processes or functions performed by means 550-592, and components thereof.

In related aspects, apparatus 500 may include a transceiver module 520 for communicating with means 550-592. A stand alone receiver and/or stand alone transmitter may be used in lieu of or in conjunction with the transceiver 520.

In further related aspects, apparatus 500 may optionally include a means for storing information, such as, for example, a memory device or memory module 540. Computer readable medium or memory device 540 may be operatively coupled to the other components of apparatus 500 via bus 510 or the like. The computer readable medium or memory device 540 may be adapted to store computer readable instructions and data for effecting the processes and behavior of means 550-592, and components thereof, or processor 530 (in the case of apparatus 500 configured as a computing device) or the methods disclosed herein. In another embodiment, any of means 550-592 may be implemented as a hardware, software, or firmware modules in communication with processor 530. In some embodiments, one or more of these means may be stored as a series of computer readable instructions on memory 540 that are executable by processor 530.

In yet further related aspects, the memory module 540 may optionally include executable code for the processor module 530 to: (a) determine a game identifier for the game; (b) collect machine parameters of a computing device, the machine parameters comprising a combination of at least one user-configurable parameter and at least one non-user-configurable parameter of the device; (c) generate a device identifier for the device based at least in part on the machine parameters; (d) determine whether an Internet connection is available for the device; (e) instruct the transceiver to send the game identifier and the device identifier to the license authority in response to the connection being available; and (f) prompt the user to complete a phone transaction with the license authority in response to the connection being available. One or more of steps (a)-(f) may be performed by processor module 430 in lieu of or in conjunction with the means 550-592 described above.

Figure 6A:
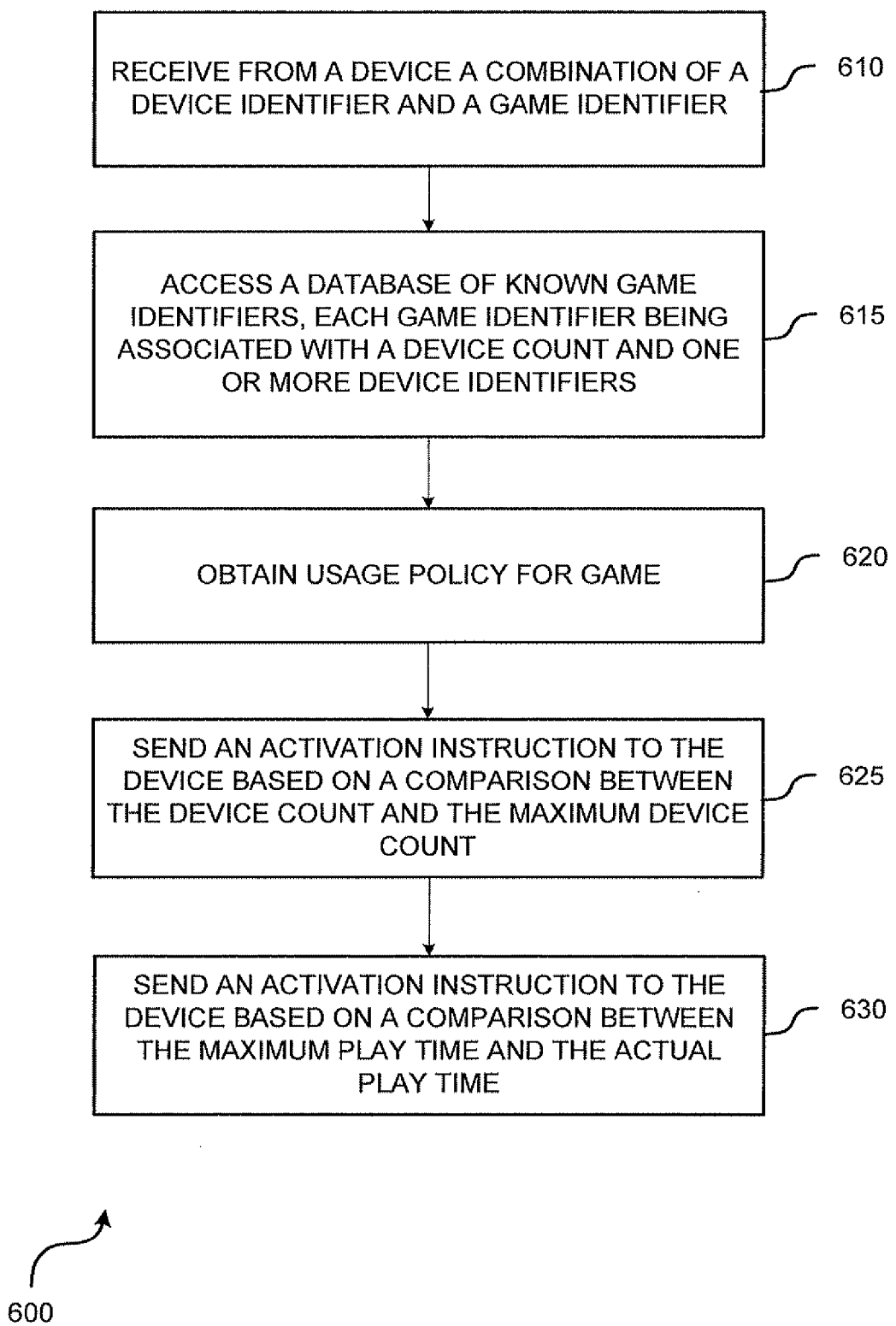
FIG. 6A shows one embodiment of a method for controlling the activation of a game.

In accordance with one or more aspects of the embodiments described herein, there are provided methods for activating a computer game in response to a user attempting to activate and/or play the game on a computing device. The activation may be done remotely such as from a remote server (e.g., from the license authority). With reference to FIG. 6A, there is provided an exemplary method 600 for activating a computer game. The method 600 may involve steps 610-655. At step 610, a combination of a device identifier and a game identifier may be received from a device. At step 615, a database of known game identifier may be accessed. Each game identifier may be associated with a device count and one or more device identifiers.

At step 620, a usage policy for the game may be obtained. The usage policy may comprise usage limitations, such as, for example, a maximum device count for the game or a maximum hours count that limits game play time. For example, when the usage policy includes a defined maximum device count, an activation instruction may be sent to a user device based on a comparison between the device count and the maximum device count (step 625). The activation instruction may be an allow instruction if the device count does not exceed the maximum device count. Alternatively, the activation instruction may be a disallow instruction if the device count exceeds the maximum device count. In another example, when the usage policy includes a defined maximum play time (e.g., maximum number of hours) that the game can be played on the user device, an activation instruction may be sent to the device based on a comparison between the actual play time/hours and the defined maximum play time (step 630).

Figure 6B:
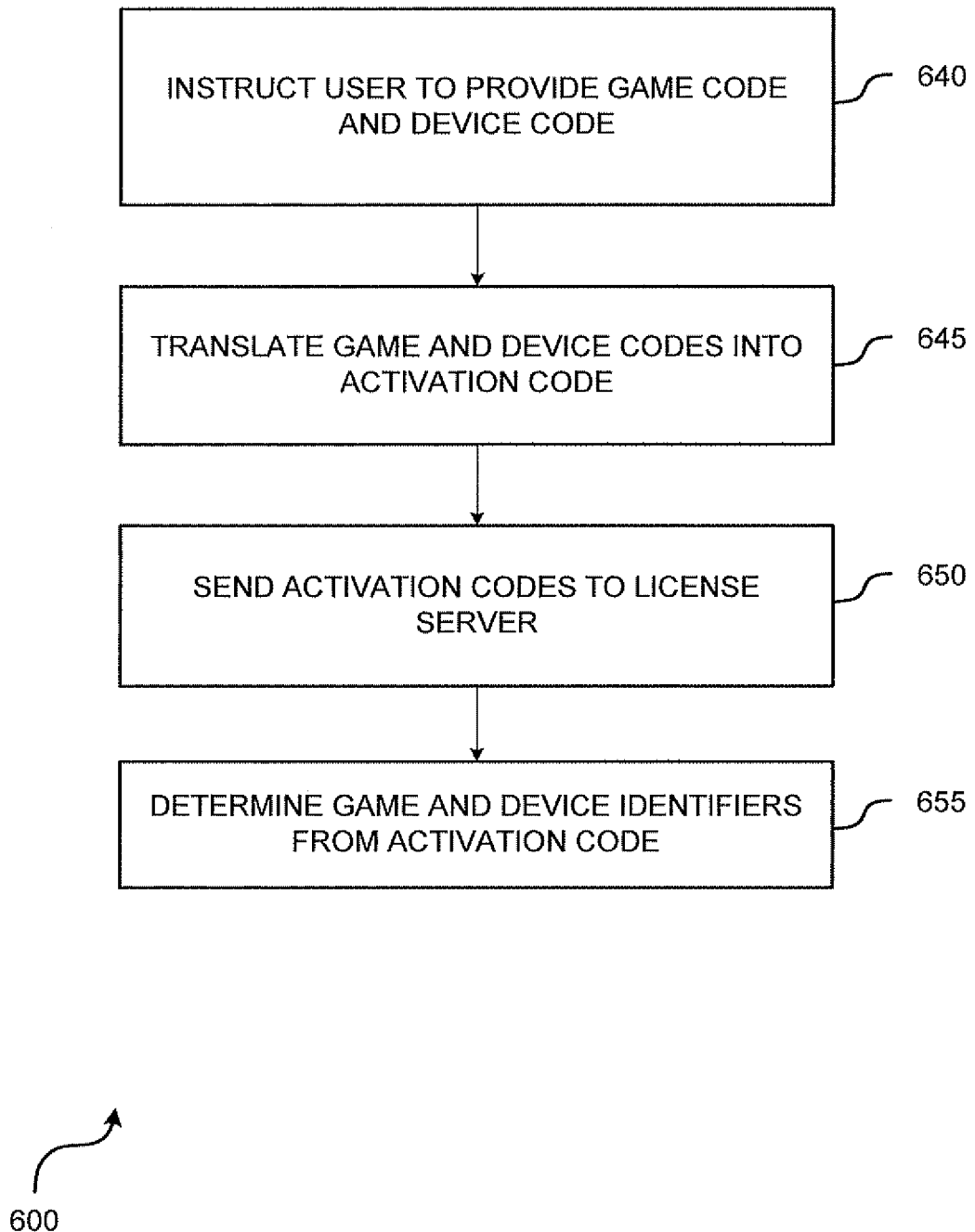
FIG. 6B shows sample aspects of the method shown in FIG. 6A.

With reference to FIG. 6B, at step 640, in response to a communication link between the device and the license authority not being available, the user may be instructed to provide a game code and a device code. The user may provide the requested information using a phone. The information may be entered via the phone keypad or vocally.

At step 645, the game and device codes may be translated into one or more activation codes. At step 650, the activation code(s) may be sent to the license authority or the license server. At step 655, the game and device identifiers are determined from the received activation code(s).

Figure 7:
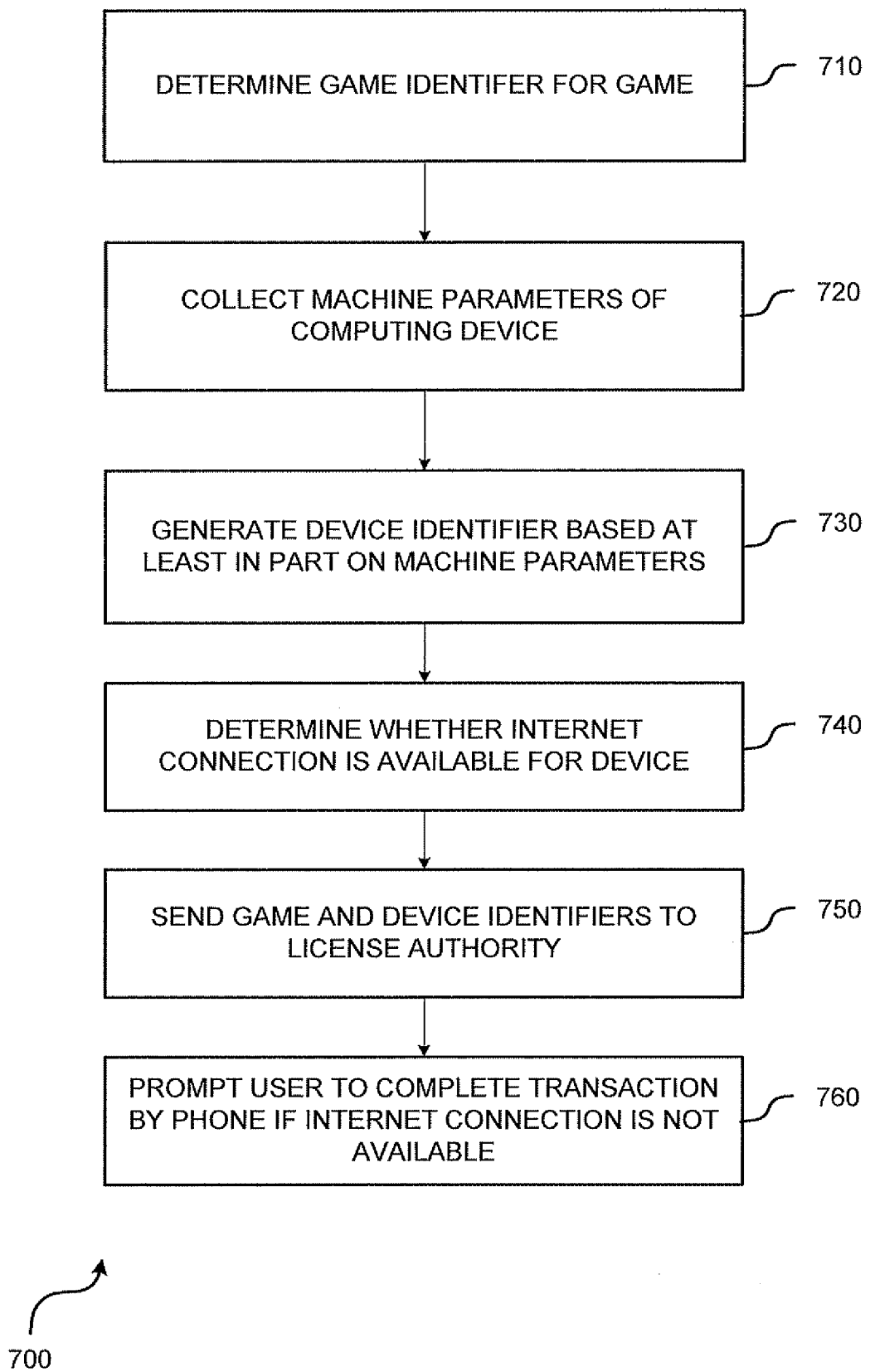
FIG. 7 shows another embodiment for a method for controlling the activation of a game.

In accordance with one or more aspects of the embodiments described herein, there are provided methods for activating a computer game in response to a user attempting to activate or play the game on the computing device. The activation may be done locally (e.g., from the computing device or user side). With reference to FIG. 7, there is provided an exemplary method 700 for activating a computer game. The method 700 may involve steps discussed below.

At step 710, a game identifier for the game is determined. At step 720, one or more machine parameters of a computing device may be collected. The machine parameters may comprise a combination of at least one user-configurable parameter and at least one non-user-configurable parameter of the device.

At step 730, a device identifier may be generated for the device based at least in part on the collected machine parameters. At step 740, whether the device has Internet connection or other communication means is determined. At step 750, a game identifier for the game and the device identifier may be transmitted to a license authority. For example, this may occur whenever a user attempts to install the game on the device and/or play the game on the device. At step 760, if an Internet connection between the device and the license authority is unavailable, the user may be prompted to complete the transaction by phone.

Figure 8:
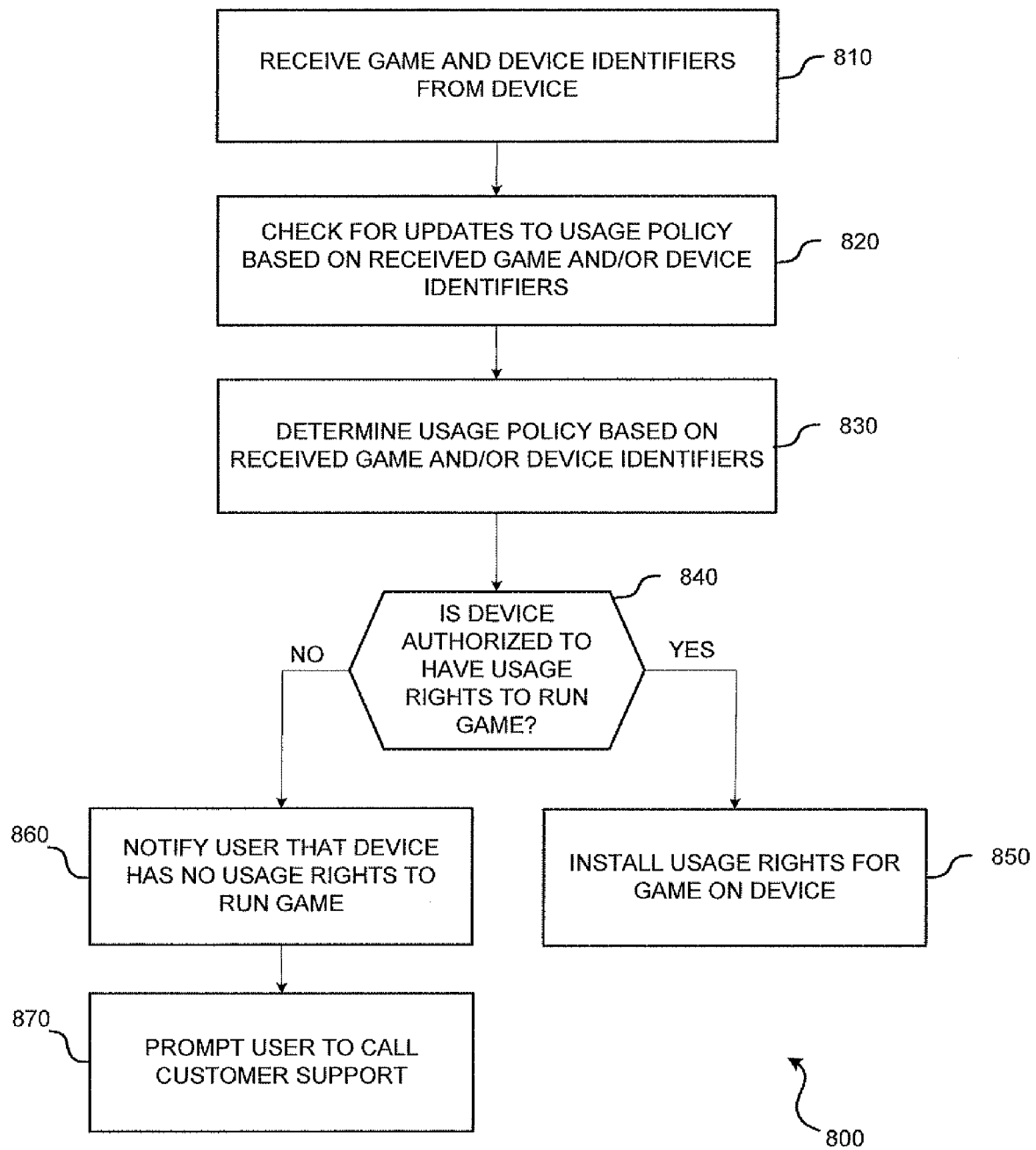
FIG. 8 shows yet another embodiment for a method for controlling the activation of a game.

In accordance with one or more aspects of the embodiments described herein, there are provided methods for activating a computer game in response to a computing device attempting to run the game. With reference to FIG. 8, there is provided an exemplary method 800 for activating a computer game. The method 800 starts at step 810 where game and/or device identifiers are received by a license authority (e.g., a license server or the like). The identifiers may be generated by the device via an instruction from the game and/or via an instruction stored in the device memory. At step 820, the license authority may check for updates to the usage policy for the game using the received game and/or device identifiers. At step 830, the usage policy for the game is determined using the received game and/or device identifiers.

At step 840, the license authority may determine whether the device is authorized to have the usage rights to run the game. If so, the usage rights to the game are installed on the device (step 850); if not, the user is notified that the device does not have the usage rights to run the game (step 860). Additionally, at step 870, the user may be prompted to call customer support and/or the user may be asked to purchase additional licensing rights for the game.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component", "module", "system" and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal).

It is understood that processes disclosed herein are illustrated in terms of salient steps, and the specific order or hierarchy of steps in the processes disclosed may be rearranged or supplemented without departing from the scope of the invention. The accompanying method claims present elements of the various steps in sample order, and are not meant to be limited to the specific order or hierarchy presented.

Moreover, various aspects or features described herein can be implemented as a method, apparatus, or article of manufacture using standard programming or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A system for activating a computer game in response to a user attempting to play the game on a computing device, comprising:

a license server configured to detect a communication link between the license server and the computing device, and to execute, responsive to detecting the communication link, functions to:

receive from the computing device a combination of (a) a game identifier for a requested game and (b) a device identifier for the computing device via the link, the device identifier derived from a combination of at least one user-configurable parameter and at least one non-user-configurable parameter of the computing device;

access a database of known game identifiers, each known game identifier being associated with (a) a known game, (b) a device count corresponding to a total number of known devices on which the known game was previously played, and (c) known device identifiers for the known devices;

obtain from the database a usage policy for the requested game, the usage policy including a maximum device count for the requested game; and send an activation instruction to the computing device based at least in part on (a) a device comparison between the device identifier for the computing device and the known device identifiers, and (b) a count comparison between the device count and the maximum device count;

an Interactive Voice Response (IVR) server in operative communication with the license server and the computing device, the IVR server configured to:

instructs the user to provide a device code comprising at least one of the device identifier and a second hash code of the device identifier;

instruct the user to complete a phone transaction in response to the license server detecting no communication link between the license server and the computing device;

translate the game code and the device code into at least one activation code; and send the at least one activation code to the license server; and wherein the license server is further configured to extract the game identifier and the device identifier from the at least one activation code.

2. The system of claim 1, wherein the activation instruction comprises a disallow instruction responsive to the device count exceeds the maximum device count, the disallow instruction preventing the user from playing the requested game on the computing device.

3. The system of claim 1, wherein the activation instruction comprises an allow instruction responsive to the device identifier matches one of the known device identifiers or responsive to the device count does not exceed the maximum device count, the allow instruction allowing the user to play the game on the computing device.

4. The system of claim 1, wherein:
the usage policy comprises a defined maximum play time for the game on the computing device; and
the activation instruction is based at least in part on a time comparison between the maximum play time and an actual play time of the game on the computing device.

5. The system of claim 4, wherein the activation instruction comprises a disallow instruction responsive to the actual play time exceeds the maximum play time, the disallow instruction preventing the user from playing the game on the computing device.

6. The system of claim 1, wherein the IVR server instructs the user to provide a game code comprising at least one of the game identifier and a first hash code of the game identifier.

7. The system of claim 1, wherein the license server is further configured to update the database in response to the combination of the game identifier and the device identifier being unique from known combinations of the known game identifiers and the known device identifiers.

8. The system of claim 1 wherein the license server is further configured to be responsive to the game identifier matches a known game identifier, and responsive to the device identifier does not match a known device identifier, the license server:

associates the device identifier with the known game identifier; and increments the device count for the known game identifier.

9. A method for activating a computer game in response to a user attempting to play the game on a computing device, comprising:

receiving from the computing device, in response to detecting availability of a communication link and via the link, a combination of (a) a game identifier for the game and (b) a device identifier for the computing device, the device identifier derived from at least one user-configurable parameter and at least one non-user-configurable parameter of the computing device;

accessing a database of known game identifiers, each known game identifier being associated with (a) a known game, (b) a device count corresponding to a total number of known devices on which the known game was previously played, and (c) known device identifiers for the known devices;

obtaining a usage policy for the game, the policy comprising a maximum device count for the game; and sending an activation instruction to the computing device based at least in part on (a) a device comparison between the device identifier for the computing device and the known device identifiers, and (b) a count comparison between the device count and the maximum device count; and sending the activation instruction to the computing device based at least in part on a time comparison between (a) a maximum play time defined in the usage policy and (b) an actual play time of the game on the computing device; and wherein the activation instruction comprises a disallow instruction responsive to the actual play time exceeds the maximum play time, the disallow instruction preventing the user from playing the game on the computing device.

10. The method of claim 9, wherein the activation instruction comprises a disallow instruction responsive to the device count exceeds the maximum device count, the disallow instruction preventing the user from playing the game on the device.

11. The method of claim 9, wherein the activation instruction comprises an allow instruction responsive to the device identifier matches one of the known device identifiers or responsive to the device count does not exceed the maximum device count, the allow instruction allowing the user to play the game on the computing device.

* * * * *